3,413,284
LOW-MOLECULAR SULFURIC ACID ESTERS OF LEVANS AND PROCESS FOR PREPARING THEM

Horst Grötsch, Frankfurt am Main, and Heinz Feier, Lorsbach, Taunus, Germany, assignors to Farbwerke Hoechst Aktiengesellschaft vormals Meister Lucius & Bruning, Frankfurt am Main, Germany, a corporation of Germany
No Drawing. Filed Jan. 7, 1965, Ser. No. 424,124
Claims priority, application Germany, Jan. 11, 1964, F 41,723
2 Claims. (Cl. 260—234)

ABSTRACT OF THE DISCLOSURE

Preparation of low-molecular weight polysulfuric acid esters of levan useful for inhibiting blood coagulation by reacting a high molecular weight levan with chlorosulfonic acid and then hydrolytically degrading the product in an acid medium.

During the last years, polysulfuric acid esters of polysaccharides have gained importance as heparinoids, since they show properties inhibiting the coagulation of blood. Due to the fact that high-molecular weight sulfur-containing compounds are strongly toxic—the toxicity being, among others, a function of the molecular weight—attempts are made to lower the molecular weight of these products. On the other hand, with decreasing molecular weight, the property of inhibiting the coagulation of blood is reduced to zero.

From the preparation of polysulfuric acid esters inhibiting the coagulation of blood, polysaccharides were hitherto first subjected hydrolytic degradation and then sulfurized. These processes require not only a high amount of labour, but, moveover, a further strong degradation of the polysaccharide occurs during sulfurization, so that a sulfurized product is formed, which, practically, no longer has any efficacy in inhibiting the coagulation of blood. For example, a levan sulfate with a viscosity of $[\eta] = 0.023$ has only 2% of the efficiency of heparin.

The present invention relates to a process for preparing low-weight polysulfuric acid esters of levans which comprises first esterifying the levans in known manner with sulfuric acid and then subjecting the high-molecular weight esters obtained to hydrolytic degradation in an acid medium.

In comparison with the known method of preparing levan sulfates, the new process has the advantage that the hydrolytic degradation takes place at the end of the process which comprises several stages so that no further undesired hydrolysis can occur.

It was surprising that in the treatment of sulfuric acid esters of levans by means of acids the glycoside linkages of the polysaccharide molecules are split, whereas the sulfuric acid ester linkages are not affected under the reaction conditions. It is known that high-molecular weight dextran and pullulane sulfates of similar structure cannot be hydrolytically degraded at all or only with difficulty.

The high-molecular weight sulfuric acid esters of levans are prepared in known manner, for instance, by treating levans with cholrosulfonic acid, preferably in the presence of a base such as pyridine. It is suitable to operate in the presence of a solvent such as formamide. When operating in this way, the sulfuric acid ester of the levan is obtained in the form of a salt which, if desired, after conversion into a metal salt, for instance the sodium salt, is subjected to hydrolysis.

The hydrolysis can be carried out in known manner by adjusting the pH-value of a salt solution of a high-molecular weight levan sulfuric acid ester to a range below about 2.5. The most simple way is to add to the solution a sufficiently strong acid, for instance, a mineral acid such as hydrochloric acid or sulfuric acid in an amount required to arrive at the above-mentioned pH-value.

The hydrolysis of the salts of high-molecular weight sulfuric acid esters of levans can be carried out in a simple and careful manner by adding to their aqueous solutions a cation exchanger containing sulfo groups. The latter exert the same action as a free strong acid, but has the advantage of hindering foreign ions from entering the solution.

Appropriate ion exchangers are commercially available, for instance under the trade marks of Amberlite IRC, 120, IRC 112, IRC 105, Dowex 50 or Lawatit KS.

Since the ion exchangers cause acidification of the solutions within a relatvely short period of time, before the hydrolysis of the sulfuric acid esters of levans has considerably increased, they can be removed from the solution already after about 2 to 5 minutes without affecting the course of the hydrolysis. In the other hand, the ion exchanger may remain in the solution until the hydrolysis is achieved, without deleteriously influencing its course.

The hydrolysis is favorably realized for about 10 to 100 minutes at an elevated temperature, for instance, between 30 and 70° C., preferably in a range between about 50 and 60° C.

The extent of the hydrolytic degradation can be increased by reducing the pH-value, increasing the duration of the hydrolysis or elevating the temperature of the solution, or it can be decreased by applying reverse measures. By choosing appropriate conditions within the above-mentioned scope which, if necessary, can be ascertained by preliminary tests, it is possible to produce sulfuric acid esters of levans having desired molecular weights and defined heparin efficiency.

The termination of the hydrolysis is favorably determined by measuring the viscosity of an isolated sample. For this purpose, the viscosity number $[\eta]$ of the acid hydrolysis solution is determined by means of a suitable viscosimeter, for instance, a viscosimeter according to Ubbelohde, at a temperature of 22.5° C.

$$\frac{\eta \text{ hydrolysis solution}}{\eta \text{ water}} = \eta \text{ relative}$$

$$\eta \text{ rel.} - 1 = \eta \text{ spec.}$$

$$\frac{\eta \text{ spec.}}{C} = [\eta]$$

C = concentration of the solution in grams/100 ml.

The sulfuric acid esters of levans are suitably degraded to a viscosity $[\eta] = 0.03$ to $0.07$ ($C=3$).

From the aqueous solution the low-molecular weight sulfuric acid esters of levans obtained by hydrolysis can be obtained in known manner by neutralization and/or precipitation of the solvent.

While showing a molecular weight of about 2000–8000 and a sulfur content of about 16–18.5%, the levan sulfuric acid esters exert a heparin action of about 3–15%. They are suitable, above all, in the form of their alkali metal salts, preferably the sodium salts, for inhibiting the coagulation of blood. They are administered in the form of aqueous injection solutions, ointments, capsules, dragees and tablets. For the production of the preparations, pharmaceutically tolerable adjuvants and carrier substances are used, such as, for instance, water, lactose, glycerine, vegetable oils and the like. Injection preparations preferably contain 50–300 milligrams of substance/milliliter of aqueous solution; in ointments, the substance is contained in a concentration of 0.5–2%. Preferably, the substances are administered orally in the form of capsules or tablets, the dosage unit form containing 50–300 milligrams of the active substance.

The following examples serve to illustrate the invention but are not intended to limit it thereto.

EXAMPLE 1

(a) 260 milliliters of chlorosulfonic acid are dropped while vigorously stirring into 1120 milliliters of pyridine at −20° C., care being taken that the temperature does not surpass +10° C. Into this reaction mixture a solution of 200 grams of high-molecular weight levan in 1200 ml. of formamide is stirred, and stirring is continued for 3 hours at 40° C. By pouring the mixture into 8 liters of methanol the product is at first precipitated in the form of the pyridinium salt. The salt obtained is dissolved in 1.5 l. of water, while adding an amount of sodium hydroxide solution sufficient to provoke alkaline reaction of the solution with phenolphthalein. The substance is again precipitated in the form of the sodium salt, by pouring the solution into 8 liters of methanol. By double reprecipitation from methanol in the manner described above, 360 grams of a high-molecular levan sulfate is obtained which has a viscosity of $[\eta]=0.50$ (measured as sodium salt) and a sulfur content of 18.30%.

(b) 75 grams of the sodium salt of levan sulfate produced as described sub (a) are dissolved in 1000 milliliters of water. After addition of an amount of Amberlite IRC 120, $H^+$=form, sufficient to attain a pH-value of the solution of 1.6, the aqueous solution is heated to 50° C. with stirring. The hydrolysis is interrupted as soon as the $[\eta]$=value of an isolated sample has reached 0.050. The acid solution is filtered off with suction from the exchanger, cooled and neutralized. It is concentrated under reduced pressure to a polysaccharide content of 25% and the product is precipitated by adding 1.0 to 1.5 liter of methanol. After drying of the product, the yield amounts to 60 grams of a white powder whose 3% aqueous solution has a viscosity $[\eta]=0.057$ and a heparin action of 15.0%. The sulfur content of the product amounts to 18.20%.

EXAMPLE 2

100 grams of the sodium salt of levan sulfate prepared according to Example 1(a) are dissolved in 1000 milliliters of water. An amount of Amberlite IRC 120, $H^+$=form sufficient to attain a pH-value of 1.8 is added to the solution. After separation of the ion exchanger from the aqueous solution the latter is heated with stirring to 50° C. As soon as a sample of the solution has a $[\eta]$=value of 0.050 to 0.065, the latter is rapidly cooled, adjusted to a pH-value of 7.0 by means of 5 N-sodium hydroxide solution and concentrated under reduced pressure to a polysaccharide content of 25%. By adding 1.0 to 1.5 liter of methanol, the hydrolysis product is precipitated. Yield after drying: 83.7 grams of a white powder. Viscosity of the 3% aqueous solution at 15 C° $[\eta]=0.056$. Heparin action 15%, sulfur content 18.20%.

EXAMPLE 3

75 grams of the sodium salt of levan sulfate, obtained as described in Example 1(a) are dissolved in 1000 milliliters of water and hydrolized as described in Example 2. When a $[\eta]$=value of 0.035 is obtained the hydrolysis is interrupted as described in Example 2. After neutralization to pH 7.0 by means of 5 N-sodium hydroxide solution, concentration under reduced pressure to a polysaccharide content of 25%, and alcohol precipitation a white powder is obtained in a yield of 58 grams (after drying). The viscosity of a 3% solution of the product in water at 22.5° C. amounts to $[\eta]=0.037$. The sulfur content of the product amounts to 18.20%, the heparin action to 6%.

EXAMPLE 4

100 grams of the sodium salt of levan sulfate, obtained according to Example 1(a) are dissolved in 1000 milliliters of water and hydrolized as described in Example 2. After a $[\eta]$=value of 0.025–0.028 is attained the hydrolysis is interrupted as described in Example 2. After neutralization to pH 7.0 by means of 5 N-sodium hydroxide solution, concentration under reduced pressure to a polysaccharide content of 35% and alcohol precipitation a whilte powder is obtained in a yield of 70 grams (after drying). The viscosity of a 3% solution of the product in water at 22.5° C. amounts to $[\eta]=0.027$–0.029. The sulfur content of the product amounts to 18.2%, the heparin action to 3.5%.

We claim:
1. A process for preparing a low-molecular weight sulfuric acid ester of levan which comprises first reacting a high-molecular weight levan with chlorosulfonic acid and then hydrolytically degrading the high-molecular weight ester obtained, in an acid medium.

2. A process as claimed in claim 1, comprising treating an alkali salt of high-molecular weight sulfuric acid ester of a levan in an aqueous medium with a cation exchanger containing sulfo-groups.

References Cited

UNITED STATES PATENTS

| | | | |
|---|---|---|---|
| 2,689,848 | 9/1954 | Husemann et al. | 260—234 |
| 2,715,091 | 8/1955 | Ricketts et al. | 260—234 |
| 2,755,275 | 7/1956 | Cushing et al. | 260—234 |

OTHER REFERENCES

Vogler: "Chem. Abst.," vol. 53, 1959, pp. 9084(f)–9085(a).

H. A. FRENCH, *Primary Examiner.*